Jan. 2, 1934.   C. CRETORS   1,941,973
CORN POPPING APPARATUS
Filed Sept. 5, 1931   2 Sheets-Sheet 1
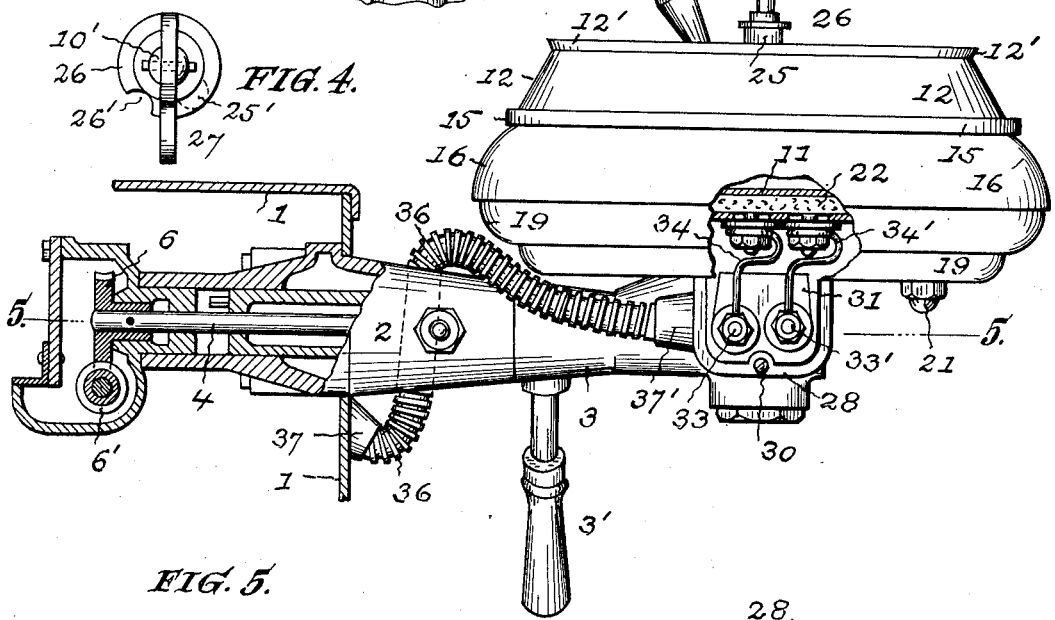
INVENTOR:
CHARLES CRETORS,
BY
Robert Burns,
ATTORNEY.

Jan. 2, 1934.  C. CRETORS  1,941,973
CORN POPPING APPARATUS
Filed Sept. 5, 1931   2 Sheets-Sheet 2
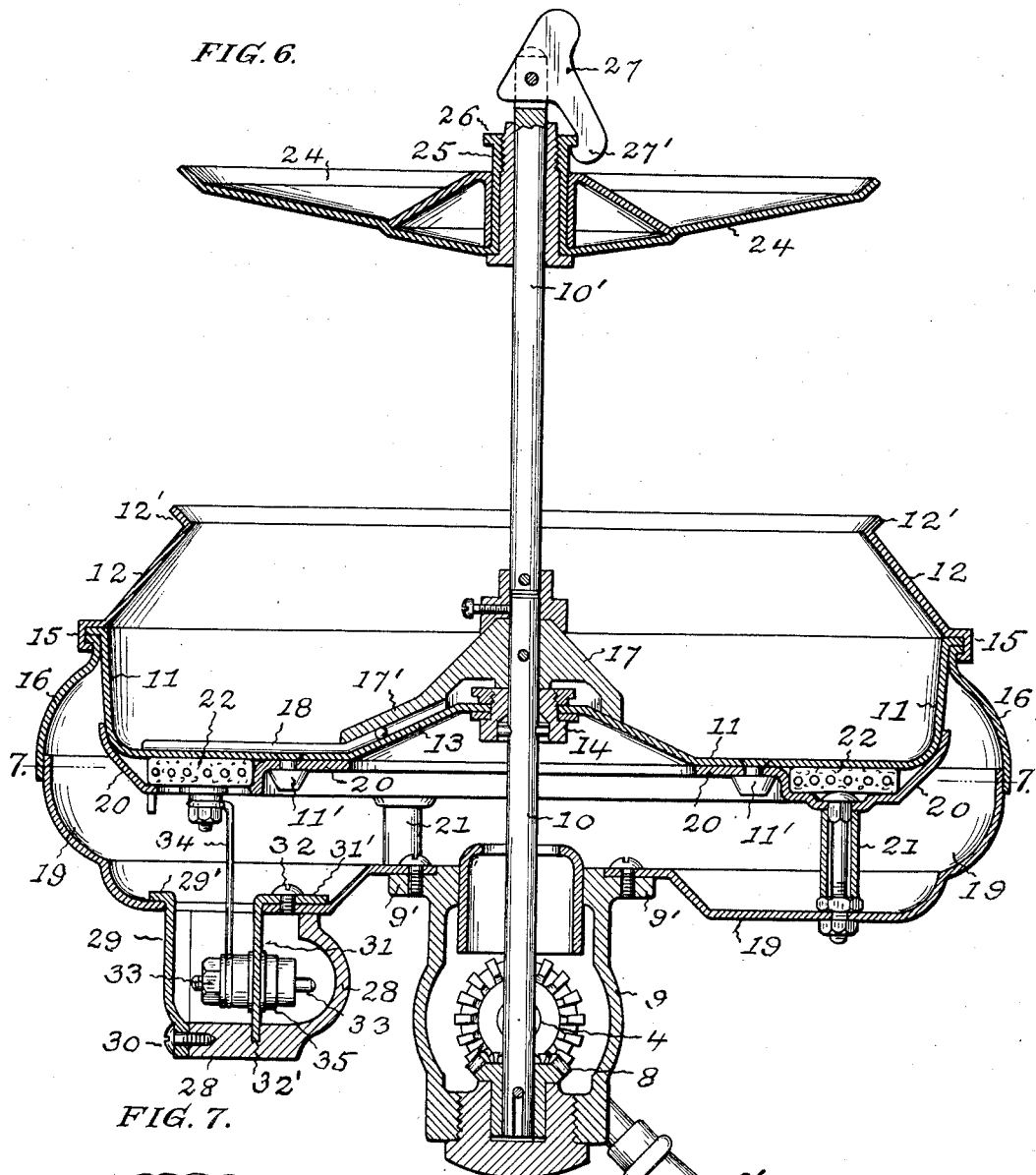
INVENTOR:
CHARLES CRETORS,
BY
Robert Burns
ATTORNEY.

Patented Jan. 2, 1934

1,941,973

UNITED STATES PATENT OFFICE 1,941,973

CORN POPPING APPARATUS

Charles Creters, Chicago, Ill.

Application September 5, 1931. Serial No. 561,431

8 Claims. (Cl. 219—19)

This invention relates to corn popping apparatus of the type in which an invertible popping pan and its associated heating unit have a turning movement at the end of the popping operation to effect a discharge of the popped corn from the popping pan, and more especially to that type of such apparatus which has an electric heating appliance as a heating means. And this improvement has for its objects:

To provide in connection with the trunnion or journal of an invertible corn popping pan, a structural formation and arrangement of the parts and elements of the electric supply means, adapted to provide a safe and constant supply connection between the electrical heating unit of an invertible popping pan and the stationary end of such supply connection.

To provide a structural formation and combination of the enclosing housing and electric supply means above referred to, adapted to provide a substantial and readily detachable connection of said housing to the bottom web of the enclosing casing of the popping pan to permit of the ready repair, replacements, etc., required from time to time in actual use of the apparatus.

To provide a structural formation and its supporting and heat insulating casing, whereby a substantial yet ready connection and disconnection between the pan and the supporting casing is provided, and in addition a simple and effective heat insulation of the heating unit attained.

To provide a clutch device between the cover member and the invertible popping pan, adapted to automatically engage and hold the pan cover in an open position when an inversion of the popping pan takes place, and until a refilling of the popping pan is effected.

In the accompanying drawings:

Fig. 1 is a front elevation, with parts broken away and in section, of an invertible corn popping apparatus having this invention applied.

Fig. 2 is an enlarged detail elevation of the automatic catch mechanism in an engaged condition with the pan cover.

Fig. 3 is a like view on a plane at right angles to the plane on which Fig. 2 is shown.

Fig. 4 is a top view of the same.

Fig. 5 is an enlarged detail section on line 5—5 Fig. 1, of the enclosing housing and contained supply and return terminals and connections by which the electric supply is carried to and from the electrical heating unit of the popping pan.

Fig. 6 is a central transverse section of the apparatus.

Fig. 7 is a detail horizontal section on line 7—7, Fig. 6, illustrating the detachable connection between the popping pan and its supporting shell or casing.

Like reference numerals indicate like parts in the several views.

In the general and preferred arrangement of parts, shown in Fig. 1, a vertical portion 1 of the enclosing housing of a corn popping apparatus of the present type, carries a stationary and horizontally extending tubular neck 2 to provide a journal support for the journal sleeve 3 of the invertible portion of the apparatus, and in such construction the journal sleeve 3 is provided with the usual operating handle 3' for convenience in imparting a semi-revolution to the invertible portion of the apparatus.

In the above construction, the primary driving shaft 4 of the apparatus is journaled centrally in said tubular neck 2 and at one end carries a worm gear 6 in driven engagement with a worm hub 6' on a power shaft that receives motion from a suitable power source. At its other end the shaft 4 carries one of a pair of angle gear wheels 8 mounted in a hollow enclosing head 9 that forms a fixed portion of the journal sleeve 3 aforesaid, with the other of said angle gear wheels having operative connection with a centrally arranged shaft 10 which carries the stirring means of the popping pan and also a guide and support for the pan cover in its vertical movement to and from the open top of the popping pan as hereinafter more fully set forth.

At its lower end the aforesaid hollow enclosing head 9 is provided with a step bearing for the shaft 10, and at its upper end is formed with an out-turned marginal flange 9' for fixed attachment to the bottom web of the hereinafter described supporting and enclosing shell or casing of the popipng pan, to constitute the sole supporting means for said parts.

The popping pan 11 of the apparatus is of the usual circular and open top formation, as more particularly described in my prior application for patent, Serial No. 552,106, filed July 21, 1931, and comprises a top section 12 having a truncated cone shape, the upper circular edge of which is in turn formed with an out-turned angular flange 12' constituting the pouring rim of the pan. In the construction shown, the bottom web of the pan is formed with an upstanding central cone portion 13 adapted to deflect the pan contents outwardly and provide a substantial attaching base for a central journal bushing 14 in which the central shaft 10 aforesaid has bearing.

The aforesaid top section 12 is made separate from the main body 11 of the popping pan, and is fixed to the margin of said body by a flanged joint 15 which also embraces the upper margin of an expanded annular and depending skirt member 16, the lower end of which is adapted to fit the upper end of the hereinafter described enclosing and supporting shell or casing of the popping pan.

The stirring unit of the popping pan comprises a central hub 17 of a conical formation fixed on the aforesaid central shaft 10 and having sliding contact on the central cone portion 13 of the popping pan. Said hub is provided with a plurality of radial arms 17' in which are fixedly secured a corresponding plurality of radial stirrer blades or bars 18.

The supporting and enclosing shell or casing 19 of the popping pan, above referred to, comprises a main open top shell the bottom web of which is fixedly attached to the out-turned marginal flange 9' of the above described hollow head 9, with its marginal upstanding rim adapted to fit the lower marginal rim of the aforesaid depending skirt member 16 of the popping pan, with said parts providing an annular heat insulating chamber around the main portion 11 of the poping pan and its associated heating unit.

An auxiliary or inner shell 20 of a shallow open top formation, smaller in size than the outer shell 19, is secured in spaced relation inside said outer shell by a plurality of intermediate stay bolts 21, as shown. Said inner shell is formed with an annular depression in its bottom web adapted to receive an annular electrical heating unit 22, of any usual and suitable formation, with its upper surface on a plane with that of the web of the shell 20.

The aforesaid annular depression in the bottom web of the auxiliary shell 20 is adapted to position the heating unit 22 with its upper surface in direct contact with the bottom web of the popipng pan 11 as shown in Fig. 6, with a view to effective heat transference.

In that it is a desirable feature in the present type of apparatus to have the popping pan 11 and attached parts readily disconnectible from the supporting and enclosing shells 19 and 20, the pan is formed for a positioning fit in the inner shell 20 aforesaid, and is provided with a plurality of depending headed studs 11' on its bottom web, with the headed portions of said studs adapted to pass down through orifices 23 in the shell 20, so that by a turning movement of the popipng pan, the reduced shanks of said studs pass into narrow elongated slot extensions 23' of the openings 23, to attain an effective connection between the parts.

The popping pan cover 24 is of the same formation as that described in my aforesaid application Serial No. 552,106, with its central guide bushing 25 in sliding engagement on an upper extension 10' of the aforesaid centrally arranged shaft 10. In the present improvement the bushing 25 is provided at its upper end with an out-turned annular flange 26 adapted for engagement with the hereinafter described catch mechanism on the upper end of the shaft extension 10', with said flange formed with a notch or gap 26' in spaced relation to a downwardly extending stud or projection 25' on the under face of the flange 26, as shown in detail in Figs. 2, 3 and 4, for the purpose hereinafter set forth.

The catch mechanism above referred to comprises a gravity dog 27, pivotally mounted in the upper end of the aforesaid shaft extension 10' and having at its lower end a hook formation 27' adapted for holding engagement beneath the flange 26 of the cover bushing 25, to hold the pan cover 24 in a position removed from the popping pan, with said engagement taking place when an inversion of the popping pan and its accessories is manually effected, such engagement continuing as the popping pan is returned to its normal non-inverted position, and until a release is effected by the operator's retarding by hand or other means, the normal rotation of the pan cover with its carrying and guide shaft extension 10', and so that the hooked end 27' of said gravity dog will ride over the aforesaid stud or projection 25' and with said hook end 27' reaching the notch or gap 26', will pass through said notch or gap as the pan cover descends by gravity to its closed condition in relation to the open top of the popping pan. In the present construction, the above described catch mechanism has no connection with the partial opening movement of the pan cover under the influence of the expanding mass of corn in the popping pan, and which is a normal and usual step in the operation of the pan cover in the present type of apparatus.

The supply of electricity to the electrical heating unit 22 of the apparatus is introduced by construction and structural arrangement of parts as follows:—

A terminal-enclosing housing 28, open at top and in front, is secured in a depending condition from the bottom web of the aforesaid enclosing casing 19 of the popping pan, with its open top in aligned relation with an orifice in the bottom web of the casing 19, and with its open front closed by a removable cover plate 29, which in this improvement is attached in place by an attaching screw bolt 30 passing through its lower margin into the housing 28. The upper end of said cover plate is provided with a lateral flange 29' adapted to engage over a margin of the aforesaid orifice in the bottom web of the casing 19 of the popping pan, so that when the cover plate is secured to the housing 28 by the screw bolt 30, the flange 29' is adapted to act as a part of the means by which a substantial and readily disconnectible connection between the housing 28 and the casing 19 is attained.

Depending through the aforesaid orifice in the bottom web of the enclosing casing 19 and into the interior of the housing 28, is a terminal carrying plate 31, the upper end of which is formed with a flange 31' adapted to engage a margin of the aforesaid orifice in the bottom web of the casing 19, and be secured to said web by attaching screws 32, to attain a fixed connection of the parts. In the construction shown in Fig. 6, the lower end of the carrying plate 31 fits into a receiving groove 32' in the bottom web of the housing 28 with a view to an effective connection of the parts.

Terminal-attaching bolts 33, 33' pass through the aforesaid carrying plate 31 in spaced and insulated relation, and have conducting connections as follows:

At one side of the carrying plate 31, with supply and return wires 34, 34' extending to the respective ends of the resistance winding of the electric heating unit 22 of the apparatus. At the other side of said carrying plate said bolts have holding and electrical connection with the flexible supply and return conductors 35, 35' by which current is supplied to and returned from the electrical heating unit 22 of the apparatus.

In the present type of invertible electrically heated apparatus, the above described enclosing housing 28 and its contained parts have a semi-revolution in the inverting operation of the apparatus, and in the succeeding return of parts to a normal position after such inverting operation. In consequence it follows that a half turn or twist of the ends of flexible supply and return conductors 35, 35' connected to the terminal attaching bolts 33, 33' must take place while the other ends of said conductors are in stationary connection with the source of electric supply. In this improvement this partial turn or twist of the flexible conductors 35, 35' is provided for in a simple effective fire safety manner, by looping said conductors 35, 35' around the aforesaid journal neck 2 and sleeve 3 which provide the invertible nature of the apparatus, and in the manner illustrated in Fig. 1. With a view to greater fire safety, said conductors are shown as enclosed in a section of spirally interlocked flexible metal tubing 36 that extends between socket sleeves 37 and 37' on the respective stationary support of the apparatus and on the terminal enclosing housing 28 aforesaid.

Having thus fully described my invention what I claim as new, is:—

1. A corn popping apparatus comprising a stationary support, an open top popping pan, associated cover and electrical heating unit mounted on the stationary support in an invertible manner, said heating unit comprising an annular heating element, a shallow shell formed with an annular depression for the reception of said element, said shell providing a support for the popping pan, an outer enclosing shell for the popping pan provided with a tubular bearing sleeve on its under side, a sleeve on the stationary support affording a journal support for said bearing sleeve, and a pair of flexible conductors extending from the stationary support to the electric heating unit and having a loop formation encircling said sleeves.

2. A corn popping apparatus as specified in claim 1, and wherein a detachable terminal housing is secured to the pan-enclosing shell and carries a supporting plate for a pair of terminal bolts that have connection with the flexible conductors and with the ends of the resistance winding of the heating unit.

3. A corn popping apparatus as specified in claim 1, and wherein an upright terminal-carrying plate is provided with a flange at its upper end for detachable connection of said terminal-carrying plate with the bottom web of the enclosing shell of the popping pan.

4. A corn popping apparatus as specified in claim 1, and wherein a terminal housing having an opening in front has detachable engagement with the pan-enclosing shell, a cover plate secured to the opening of the terminal housing, a terminal-supporting plate fixedly secured in said housing and provided with a flange at its upper end for supporting engagement with the bottom web of the outer shell of the popping pan.

5. A cover mechanism for corn popping apparatus of the type herein described comprising a vertically arranged rotary shaft adapted for operative connection with the stirring means of a popping pan, a cover slidingly mounted on said shaft and provided at the top with an annular flange, and a latching means comprising a gravity dog pivoted in the upper end of said shaft and adapted to engage the aforesaid cover flange and hold the cover in its open position, said flange being provided with a marginal gap adapted to move into register with the gravity dog and permit the pan cover to move to its closed position.

6. A cover mechanism for corn popping apparatus as specified in claim 5 and wherein the annular flange at the top of the pan cover is provided with a retarding projection on its underside and in spaced relation to a marginal gap in said flange.

7. A corn popping apparatus, as specified in claim 1, and wherein an inner cup-shaped shell provides supporting means for the popping pan and the electrical heating element thereof, and an outer enclosing shell arranged in spaced relation to said inner shell to provide insulated relation between the two shells, the popping pan having a depending skirt portion extending to the top margin of said outer enclosing shell.

8. A corn popping apparatus, as specified in claim 1, and wherein the popping pan is formed by upper and lower sections and an annular depending skirt, fixedly attached together by an annular flange coupling.

CHARLES CRETORS.